United States Patent
Setlur et al.

(10) Patent No.: US 6,809,781 B2
(45) Date of Patent: Oct. 26, 2004

(54) PHOSPHOR BLENDS AND BACKLIGHT SOURCES FOR LIQUID CRYSTAL DISPLAYS

(75) Inventors: Anant Achyut Setlur, Niskayuna, NY (US); Alok Mani Srivastava, Niskayuna, NY (US); Holly Ann Comanzo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 126 days.

(21) Appl. No.: 10/065,181

(22) Filed: Sep. 24, 2002

(65) Prior Publication Data

US 2004/0056990 A1 Mar. 25, 2004

(51) Int. Cl.[7] ............................................. G02F 1/1335
(52) U.S. Cl. ........... 349/70; 252/301.4 R; 252/301.4 P; 252/301.4 F; 252/301.4 H; 252/301.6 P; 252/301.6 F
(58) Field of Search ................... 252/301.4 R, 301.4 P, 252/301.4 F, 301.4 H, 301.6 P, 301.6 F; 319/70

(56) References Cited

U.S. PATENT DOCUMENTS

| | | | |
|---|---|---|---|
| 4,540,763 A | | 9/1985 | Kirchhoff |
| 4,573,766 A | | 3/1986 | Bournay, Jr. et al. |
| 4,882,617 A | * | 11/1989 | Vriens ......................... 348/779 |
| 5,000,878 A | | 3/1991 | Chu |
| 5,185,391 A | | 2/1993 | Stokich, Jr. |
| 5,608,554 A | | 3/1997 | Do et al. |
| 5,616,285 A | * | 4/1997 | Zhang .................. 252/301.4 R |
| 5,815,228 A | | 9/1998 | Flynn |
| 5,838,101 A | * | 11/1998 | Pappalardo .................. 313/487 |
| 5,926,239 A | * | 7/1999 | Kumar et al. .................. 349/69 |
| 5,965,907 A | | 10/1999 | Huang et al. |
| 5,982,092 A | | 11/1999 | Chen |
| 6,084,250 A | | 7/2000 | Justel et al. |
| 6,180,029 B1 | * | 1/2001 | Hampden-Smith et al. .......... 252/301.4 R |
| 6,203,726 B1 | * | 3/2001 | Danielson et al. ..... 252/301.4 R |
| 6,224,240 B1 | * | 5/2001 | Shimizu et al. ............. 362/260 |
| 6,252,254 B1 | * | 6/2001 | Soules et al. .................. 257/89 |
| 6,278,135 B1 | | 8/2001 | Srivastava et al. |
| 6,280,890 B1 | | 8/2001 | Sawamura et al. |
| 6,327,008 B1 | | 12/2001 | Fujiyoshi |
| 6,466,135 B1 | * | 10/2002 | Srivastava et al. ....... 340/815.4 |
| 6,469,322 B1 | * | 10/2002 | Srivastava et al. ............. 257/89 |
| 6,492,526 B1 | * | 12/2002 | Christou et al. ............ 548/101 |
| 6,621,211 B1 | * | 9/2003 | Srivastava et al. .......... 313/503 |
| 6,653,765 B1 | * | 11/2003 | Levinson et al. ........... 313/112 |
| 2002/0158565 A1 | | 10/2002 | Comanzo et al. |

FOREIGN PATENT DOCUMENTS

EP                993022          4/2000

\* cited by examiner

Primary Examiner—Kenneth Parker
(74) Attorney, Agent, or Firm—Toan P. Vo; Patrick K. Patnode

(57) ABSTRACT

A phosphor composition that comprises at least one phosphor emitting in each of the blue, green, and red regions of the visible spectrum is disposed adjacent to a backlight source of a color liquid crystal display. The phosphor composition emits strongly in the wavelength ranges of color filters used in such display. The backlight source includes either a semiconductor light-emitting diode or an organic light-emitting device.

28 Claims, 5 Drawing Sheets

PHOSPHOR BLENDS AND BACKLIGHT SOURCES FOR LIQUID CRYSTAL DISPLAYS

FEDERAL RESEARCH STATEMENT

This invention was first conceived or reduced to practice in the performance of work under contract 70 NANN8H4022 awarded by the United States National Institute of Standards and Technology. The United States of America may have certain rights to this invention.

BACKGROUND OF INVENTION

The present invention relates generally to liquid crystal displays ("LCDs") and backlight sources thereof. In particular, the present invention relates to phosphor blends for improved back lighting for color LCDs.

LCDs are widely used in the electronic industry on products ranging from cellular telephones, calculators, and watches to computers and information displays in automobiles. LCDs have many advantages over competing display technologies in areas such as size, cost, design, flexibility, reliability, and power consumption. These advantages make LCDs a popular choice for designers of electronic devices.

Liquid crystal material is characterized in that the light transmission through a thin layer of liquid crystal may be altered by applying an electric field to the material. This property is put to use in LCDs.

The essential component of an LCD consists of a thin liquid crystal material contained between two transparent plates, made of a material such as glass or an organic polymer. The inner surfaces of the transparent plates are provided with transparent electrodes that define the patterns, characters, or images to the displayed. The outer surfaces of the transparent plates are provided with polarizing lenses. When a voltage is applied across a pair of corresponding electrodes, light is blocked or permitted to pass through the assembly, depending on the relative orientation of the polarizing lenses. The location at which two electrodes overlap defines a pixel of the display. Such a display is termed a passive matrix display. In an active matrix display, a matrix of thin-film transistors (TFTs) are disposed on one transparent plate to serve as switching elements. A common electrode is provided on the second transparent plate. When a particular TFT is addressed to switch on, the liquid crystal material between that TFT and the common electrode becomes untwisted and allows light to pass through. A precisely controlled voltage can be supplied to the TFT to control the brightness at the pixel. Red, green, and blue color filters are disposed at adjacent pixels to create a different shade and color from each group of three TFTs when the chosen TFT is activated with a controlled level of voltage.

For display devices having high luminance, a source of backlight is provided behind the transparent plate opposite to the viewer. A miniature fluorescent lamp or a plurality of light-emitting diodes ("LEDs") is typically used for this purpose. Such a light source that emits a broad spectrum, coupled with the color filters, allows for the transmission of a particular light color through the pixel. One white light-emitting backlight system disclosed in U.S. Pat. No. 5,982,092 consists of semiconductor LEDs emitting blue light or ultraviolet ("UV") radiation in the wavelength range of 360–380 nm coupled with a layer of yellow light-emitting $Y_3Al_5O_{12}$:Ce phosphor. such a system is not energy-efficient because the emission spectrum of $Y_3Al_5O_{12}$:Ce is not concentrated in the wavelength ranges specific to the color filters that are typically used (about 440–460 nm, about 550–570 nm, and about 630–680 nm), as is shown in FIG. 1.

Therefore, there is a continued need to provide more energy-efficient backlight systems for LCDs. It is also very desirable to provide phosphor blends for improved color LCDs.

SUMMARY OF INVENTION

The present invention provides phosphor compositions for backlight sources in LCDs. Such phosphor compositions offer improved utilization of energy by emitting visible light more intensely in the wavelength ranges of typical blue, green, and red color filters. The terms "light" and "electromagnetic radiation" are used interchangeably herein to mean electromagnetic radiation having wavelengths in the range from about 200 nm to about 770 nm.

A phosphor composition of the present invention comprises at least a phosphor emitting blue light, at least a phosphor emitting green light, and at least a phosphor emitting red light. The phosphor emitting blue light is selected from the group consisting of $(Sr,Ca,Ba,Mg)_{10}(PO_4)_6$ (F,Cl,Br,OH):$Eu^{2+}$ (hereinafter also called "SECA"); $(Ba,Sr,Ca)MgAl_{10}O_{17}$:Eu (hereinafter also called "BAM"); $(Sr,Ca)_{10}(PO_4)_6 \cdot nB_2O_3$:$Eu^{2+}$, wherein 0<n<1; 2 SrO•0.84 $P_2O_5$•0.16 $B_2O_3$:$Eu^{2+}$; $Sr_2Si_3O_8$•2 $SrCl_2$:$Eu^{2+}$; $Ba_3MgSi_2O_8$:$Eu^{2+}$; $Sr_4Al_{14}O_{25}$:$Eu^{2+}$ (hereinafter also called "SAE"); $BaAl_8O_{13}$:$Eu^{2+}$; and mixtures thereof. The phosphor emitting green light is selected from the group consisting of $(Ba,Sr,Ca)MgAl_{10}O_{17}$:$Eu^{2+}$,$Mn^{2+}$ (hereinafter also called "BAMn"); $(Ba,Sr,Ca)Al_2O_4$:$Eu^{2+}$; $(Y,Gd,Lu,Sc,La)BO_3$:$C^{3+}$,$Tb^{3+}$; $(Ba,Sr,Ca)_2SiO_4$: $Eu^{2+}$; $(Ba,Sr,Ca)_2(Mg,Zn)Si_2O_7$:$Eu^{2+}$; $(Sr,Ca,Ba)(Al,Ga,In)_2S_4$:$Eu^{2+}$; $(Y,Gd,Tb,La,Sm,Pr,Lu)_x(Al,Ga,In)_yO_{12}$:$Ce^{3+}$, wherein x is in the range from about 2.8 to and including 3, and y is in the range from about 4.9 to about 5.1; $(Sr,Ca,Ba,Mg,Zn)_2P_2O_7$:$Eu^{2+}$, $Mn^{2+}$ (hereinafter also called "SPP"); $(Ca,Sr,Ba,Mg)_{10}(PO_4)_6(F,Cl,Br,OH)$: $Eu^{2+}$,$Mn^{2+}$ (hereinafter also called "HALO"); $(Ca,Sr,Ba)_8(Mg,Zn)(SiO_4)_4(Cl,F)_2$:$Eu^{2+}$,$Mn^{2+}$ (hereinafter also called "CASI"); and mixtures thereof. The phosphor emitting red light is selected from the group consisting of $(Gd,Y,Lu,La)_2O_3$:$Eu^{3+}$,$Bi^{3+}$; $(Gd,Y,Lu,La)_2O_2S$:$Eu^{3+}$,$Bi^{3+}$; $(Gd,Y,Lu,La)VO_4$:$Eu^{3+}$,$Bi^{3+}$; $SrS$:$Eu^{2+}$; $SrY_2S_4$:$Eu^{2+}$; $CaLa_2S_4$:$Ce^{3+}$; $(Ca,Sr)S$:$Eu^{2+}$; 3.5 MgO•0.5 $MgF_2$•$GeO_2$:$Mn^{4+}$ (hereinafter also called "MFG"); $(Ba,Sr,Ca)MgP_2O_7$:$Eu^{2+}$,$Mn^{2+}$; and mixtures thereof.

In one aspect of the present invention, an LCD comprises a backlight source comprising at least a light source emitting in at least a range from about 300 nm to about 450 nm and a light-conversion phosphor composition comprising at least a phosphor emitting blue light, a phosphor emitting green light, and a phosphor emitting red light. The phosphor composition is disposed to receive electromagnetic radiation emitted by the light source and emits visible light.

In another aspect of the present invention, the phosphor composition is disposed between the light source and a layer of liquid crystal material of the LCD.

Other features and advantages of the present invention will be apparent from a perusal of the following detailed description of the invention and the accompanying drawings in which the same numerals refer to like elements.

DETAILED DESCRIPTION

The present invention provides phosphor compositions for backlight sources in LCDs.

A phosphor composition of the present invention comprises at least a phosphor emitting blue light, at least a phosphor emitting green light, and at least a phosphor emitting red light. The phosphor emitting blue light is selected from the group consisting of $(Sr,Ca,Ba,Mg)_{10}(PO_4)_6(F,Cl,Br,OH):Eu^{2+}$; $(Ba,Sr,Ca)MgAl_{10}O_{17}:Eu^{2+}$; $(Sr,Ca)_{10}(PO_4)_6 \cdot nB_2O_3:Eu^{2+}$, wherein $0<n<1$; $2\ SrO \cdot 0.84\ P_2O_5 \cdot 0.16\ B_2O_3:Eu^{2+}$; $Sr_2Si_3O_8 \cdot 2\ SrCl_2:Eu^{2+}$; $Ba_3MgSi_2O_8:Eu^{2+}$; $Sr_4Al_{14}O_{27}:Eu^{2+}$; $BaAl_8O_{13}:Eu^{2+}$; and mixtures thereof. The phosphor emitting green light is selected from the group consisting of $(Ba,Sr,Ca)MgAl_{10}O_{17}:Eu^{2+},Mn^{2+}$; $(Ba,Sr,Ca)Al_2O_4:Eu^{2+}$; $(Y,Gd,Lu,Sc,La)BO_3:Ce^{3+},Tb^{3+}$; $(Ba,Sr,Ca)_2 SiO_4:Eu^{2+}$; $(Ba,Sr,Ca)_2(Mg,Zn)Si_2O_7:Eu^{2+}$; $(Sr,Ca,Ba)(Al,Ga,In)_2S_4:Eu^{2+}$; $(Y,Gd,Tb,La,Sm,Pr,Lu)_x(Al,Ga,In)_yO_{12}:Ce^{3+}$, wherein x is in the range from about 2.8 to and including 3, and y is in the range from about 4.9 to about 5.1; $(Sr,Ca,Ba,Mg,Zn)_2P_2O_7:Eu^{2+},Mn^{2+}$; $(Ca,Sr,Ba,Mg)_{10}(PO_4)_6(F,Cl,Br,OH):Eu^{2+},Mn^{2+}$; $(Ca,Sr,Ba)_8(Mg,Zn)(SiO_4)_4(Cl,F)_2:Eu^{2+},Mn^{2+}$; and mixtures thereof. The phosphor emitting red light is selected from the group consisting of $(Gd,Y,Lu,La)_2O_3:Eu^{3+},Bi^{3+}$; $(Gd,Y,Lu,La)_2O_2S:Eu^{3+},Bi^{3+}$; $(Gd,Y,Lu,La)VO_4:Eu^{3+},Bi^{3+}$; $SrS:Eu^{2+}$; $SrY_2S_4:Eu^{2+}$; $CaLa_2S_4:Ce^{3+}$; $(Ca,Sr)S:Eu^{2+}$; $3.5\ MgO \cdot 0.5\ MgF_2 \cdot GeO_2:Mn^{4+}$; $(Ba,Sr,Ca)MgP_2O_7:Eu^{2+},Mn^{2+}$; and mixtures thereof. It is to be understood that the chemical composition of a phosphor disclosed above can vary slightly from the stoichiometric composition indicated, as the phosphor host lattice can accommodate a small amount of lattice defects. Such phosphors are within the scope of the present invention. These phosphors are excitable by electromagnetic radiation in the wavelength range from about 300 nm to about 450 nm and efficiently emit in the blue, green, or red visible region. Therefore, a blend of these selected phosphors are advantageously used in conjunction with at least an LED emitting in the wavelength range from about 300 nm to about 450 nm to provide backlight sources to LCDs.

In one aspect of the present invention, the phosphors of the blend are selected such that the composite emission spectrum thereof exhibits strong intensity in the wavelength ranges specific to the color filters (e.g., blue, green, and red filters) used in the LCD. For example, many commercial color filter materials are designed to pass through light having wavelengths of 440–460 nm (blue), 550–570 nm (green), and 630–680 nm (red).

Figure 1:
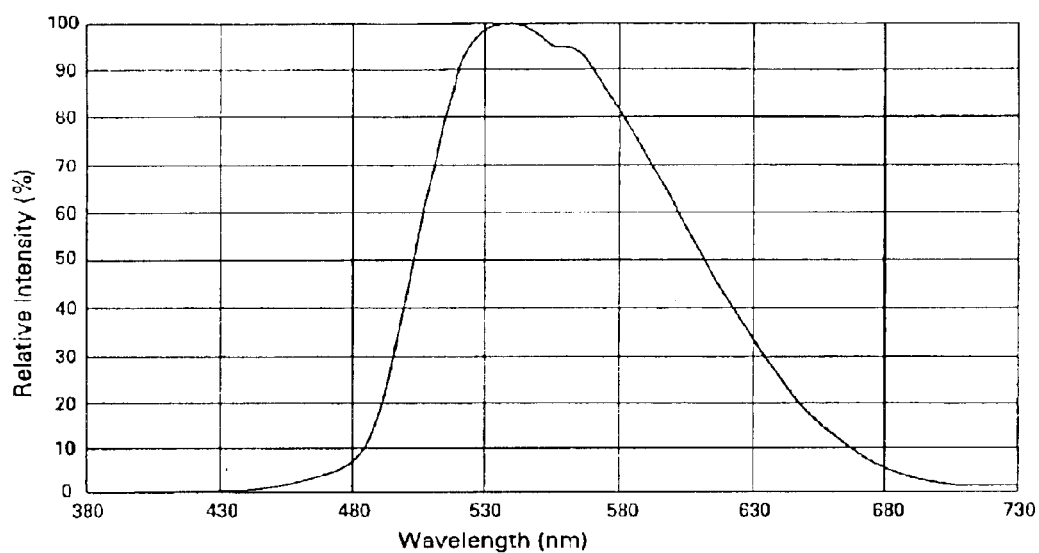
FIG. 1 is an emission spectrum of the $Y_3Al_5O_{12}$:$Ce^{3+}$ phosphor of the type used in a prior art LCD backlight, as disclosed in U.S. Pat. No. 5,982,092.
Figure 2:
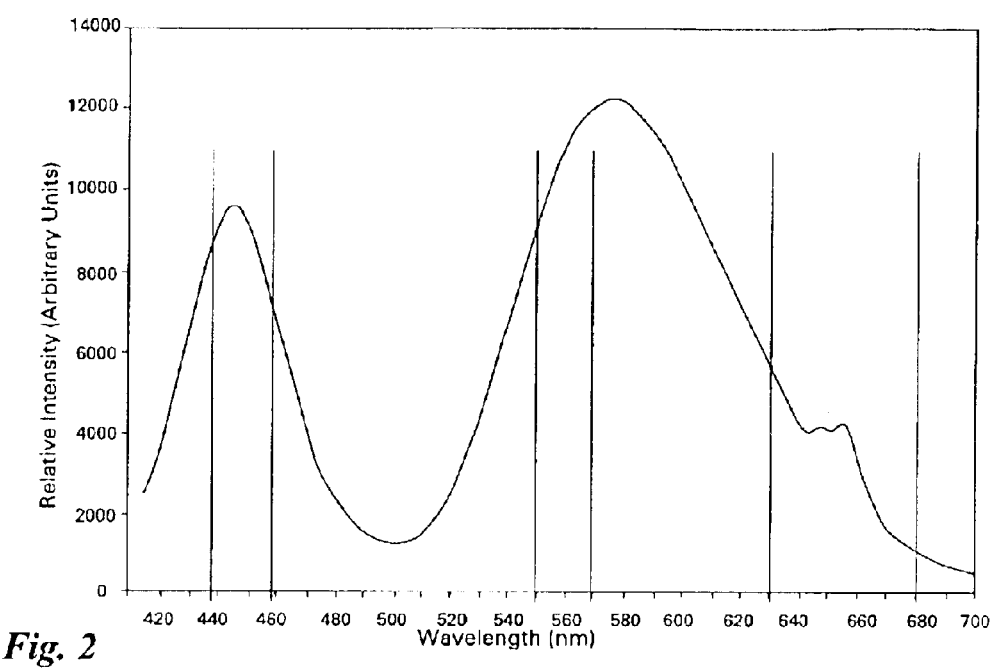
FIG. 2 shows an emission spectrum of a phosphor blend consisting of $(Sr_{0.79}Eu_{0.1}Mn_{0.1}Mg_{0.11})_2P_2O_7$, SECA, and MFG.
Figure 3:
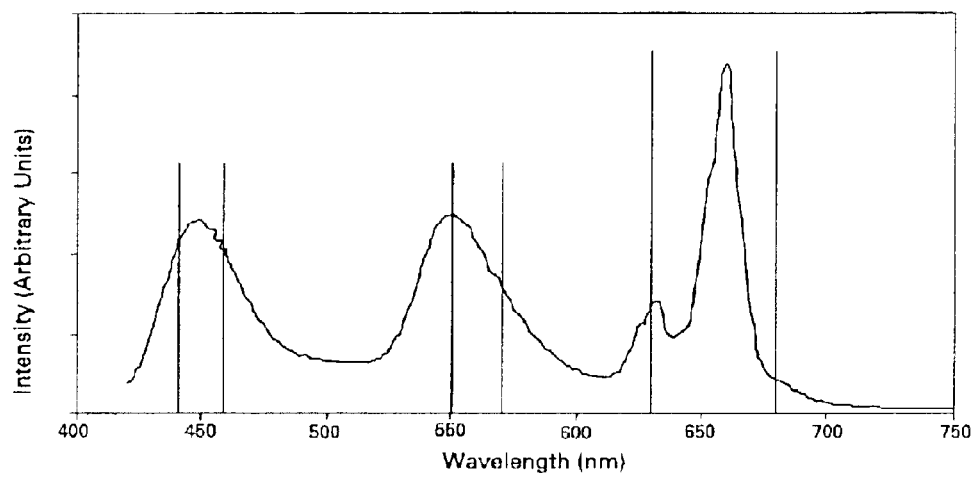
FIG. 3 shows an emission spectrum of a phosphor blend consisting of CASI, SECA, and MFG.

FIGS. 2 and 3 show emission spectra of phosphor blends consisting of $(Sr_{0.79}Eu_{0.1}Mn_{0.1}Mg_{0.11})_2P_2O_7$, SECA, and MFG; and CASI, SECA, and MFG along with the wavelength ranges of blue, green, and red color filters. The phosphor blends were excited by a blue light-emitting LED at a wavelength of about 405 nm.

The phosphor of a blend of the present invention may be mixed together by any mechanical method including without limitation stirring or blending in a high-speed blender or a ribbon blender. The phosphors may be combined and pulverized together in a bowl mill, a hammer mill, or a jet mill. It may be desirable to reduce the phosphor particle size to below 4 micrometers, and preferably below 2 micrometers.

The phosphor blend can be dispersed in a substantially transparent resin, and a light-conversion sheet is made of the mixture and cured to be disposed between the backlights and the layer of liquid crystal material. The phrase "substantially transparent" means allowing at least 80 percent, preferably at least 90 percent, more preferably at least 95 percent, of light in the visible wavelengths to pass through a thickness of about 1 mm. Examples of suitable resins for the manufacture of a light-conversion sheet includes, but are not limited to, acrylate resins, epoxy resins, silicone, and silicone-functionalized epoxy. The light-conversion sheet may also comprise particles of a scattering material, such as $TiO_2$ or $Al_2O_3$, having particle size similar to that of the phosphor blend. The light-conversion sheet may be made by any suitable method, such as casting, spreading, rolling, spraying on a substrate, etc.

Figure 4:
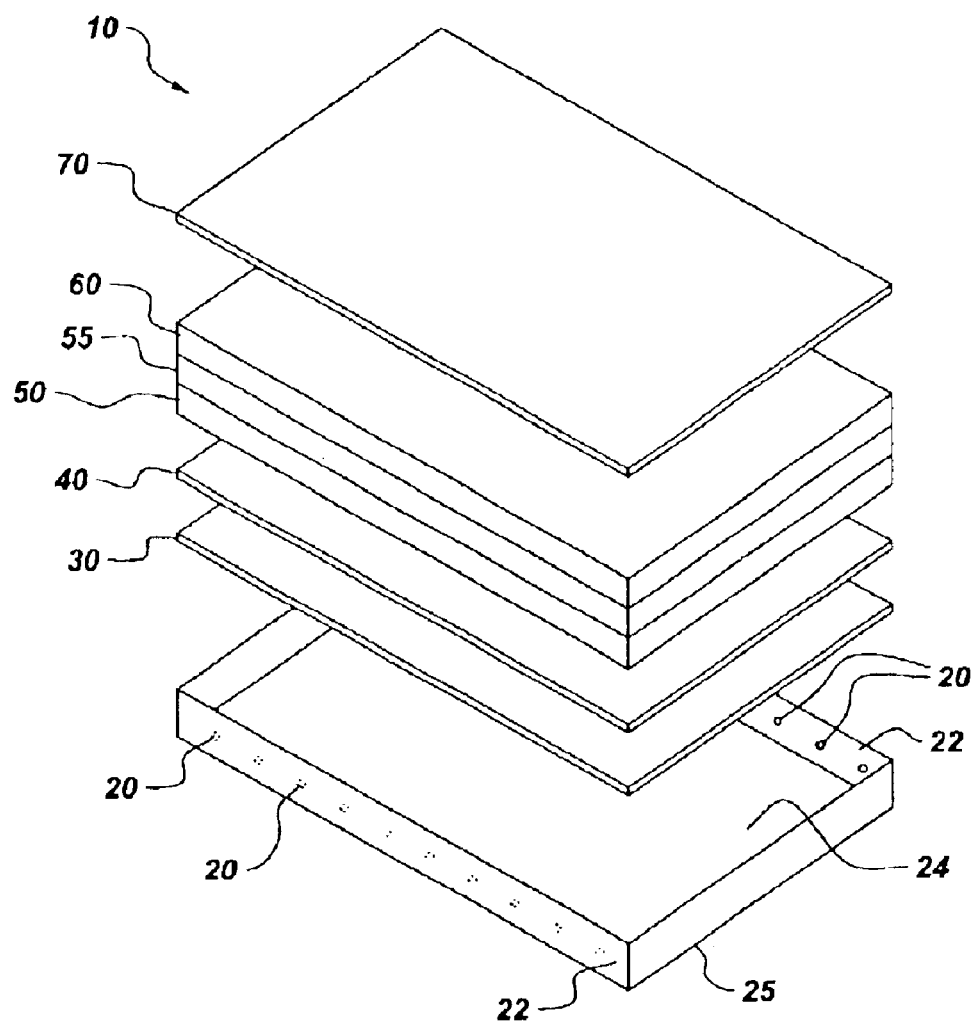
FIG. 4 shows perspectively separated components of an LCD using a backlighting system comprising LEDs and a light-conversion layer of the present invention.

FIG. 4 shows perspectively separated components of an LCD 10 using an embodiment of the present invention for backlighting. LEDs 20, along with their associated electrical circuit, are disposed on side walls 22 of a tray 25. Tray 25 has a reflective bottom surface 24 for upward reflecting electromagnetic radiation emitted by LEDs 20. A light-conversion sheet 30 comprising particles of a phosphor blend of the present invention dispersed in a substantially transparent resin is disposed on tray 25. The phosphor particles in light-conversion sheet 30 receive and absorb electromagnetic radiation emitted by LEDs 20 and reflected from surface 24 and emit light in the visible wavelengths having intensity concentrated in the blue, green, and read regions. A light scattering layer (not shown) may be disposed between tray 25 and light-conversion layer 30. The light scattering layer typically has raised features, such as raised dots or corrugated strips, on at least a surface. A first light polarizer 40 is disposed on light-conversion layer 30. A layer 55 of a liquid crystal material, such as a twisted nematic liquid crystal, is contained between two transparent plates 50 and 60. The assembly of layer 55 and plates 50 and 60 is disposed on the first light polarizer 40. The surfaces of transparent plates 50 and 60 adjacent to liquid crystal layer 55 carry patterned electrodes that impart a matrix of pixels on the liquid crystal material when a voltage is applied between the electrodes. Blue, green, and red color filters are provided on one transparent plate at the locations of the pixels so as to allow the control of the light color transmitted through each of the pixels. A second light polarizer 70 is disposed on the liquid crystal assembly. In addition, other optional layers, such as light diffusers or protective layers, may be included.

Transparent plates 50 and 60 can comprise glass or transparent plastic plates or films. Non-limiting plastic materials are polyethylenterephathalate ("PET"), polyacrylates, polycarbonate, silicone, epoxy resins, silicone-functionalized epoxy resins, polyester, polyimide, polyetherimide, PES, PEN, polynorbonenes, or poly(cyclic olefins). Such plastic plates or films are advantageously coated on at least one surface thereof with diffusion barrier coatings to prevent unwanted diffusion of reactive chemical species, including without limitation oxygen, water vapor, sulfur-containing compounds, and acid gases, from the environment. A diffusion barrier coating can comprise a multilayer coating of alternating layers of at least an inorganic material and at least an organic material. The inorganic material of the multilayer diffusion barrier coating is typically selected from the group consisting of metals (the thickness, of metallic layers being selected to render the layer substantially transparent), metal carbides, metal oxides, metal nitrides, metal oxycarbides, metal oxynitrides, and carbonitride. The inorganic layer may be deposited on the plastic plate or film by physical vapor deposition, chemical vapor deposition, ion-beam assisted deposition, sputtering, or plasma-enhanced chemical vapor deposition. The thickness of each inorganic layer is typically in the range from about 1 nm to about 500 nm. The organic material of the multilayer diffusion barrier coating is typically selected from the group consisting of polyacrylates such as polymers or copolymers of acrylic acid, methacrylic acid, esters of these acids, or acylonitrile; poly(vinyl fluoride); poly(vinylidene chloride); poly(vinyl alcohol); copolymer of vinyl alcohol and glyoxal; PET, parylene, and polymers derived from cycloolefins and their derivatives such as poly (arylcyclobutene) disclosed in U.S. Pat. Nos. 4,540,763 and 5,185,391. The thickness of the organic layer is typically in the range from about 1 nm to about 10000 nm, preferably from about 10 nm to about 5000 nm.

In one embodiment wherein LEDs are used as the light source for backlight, the mixture of the substantially transparent resin, phosphor blend, and optionally scattering material is formed into a light-conversion casting that is disposed adjacent to the semiconductor light-emitting element of each of the LEDs to receive light emitted therefrom.

Figure 5:
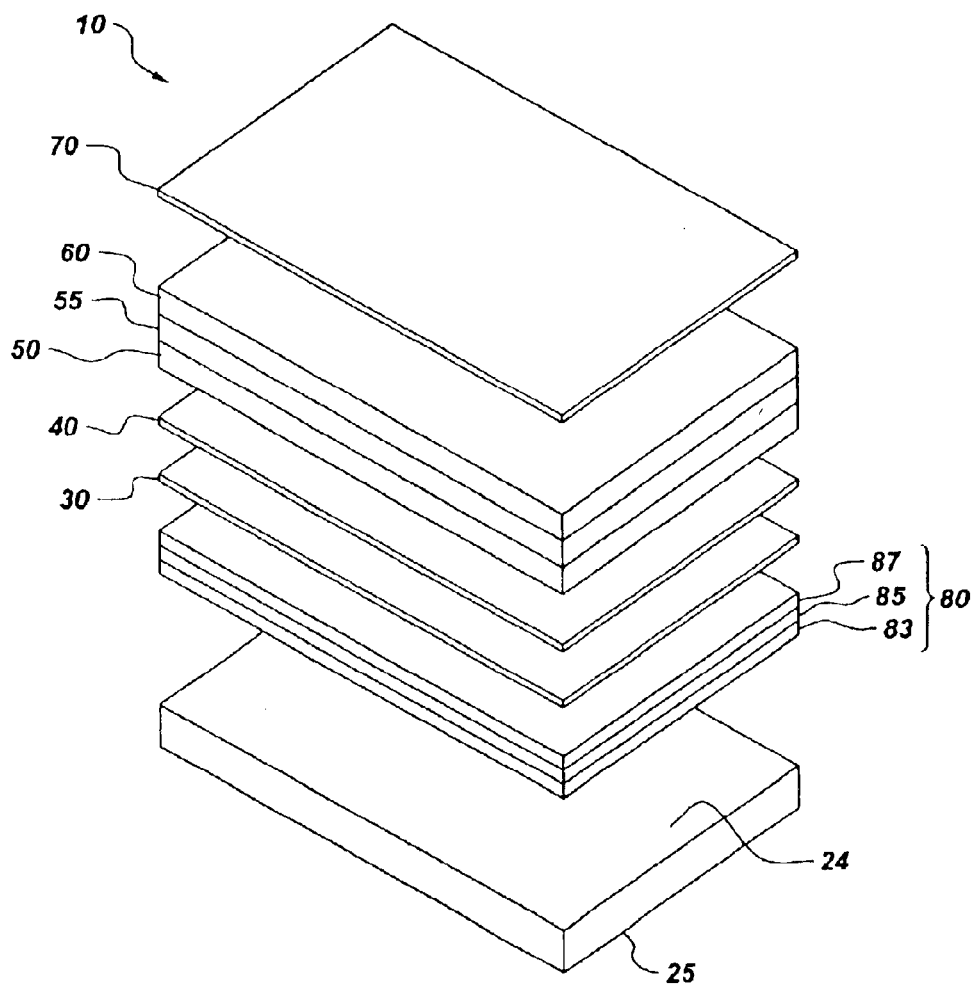
FIG. 5 shows perspectively separated components of an LCD using a backlighting system comprising an organic electroluminescent device and a light-conversion layer of the present invention.

In another embodiment of the present invention as shown in FIG. 5, the light source to provide backlight for an LCD 10 comprises an organic light-emitting device ("OELD") 80. Such an OELD 80 typically comprises a layer 85 of an organic electroluminescent ("EL") disposed between two electrodes 83 and 87, which organic EL material is capable of emitting light when a voltage is applied across the electrodes 83 and 87. The assembly of electrodes 83 and 87 and organic light-emitting layer 85 may be further disposed or formed on a substantially transparent substrate made of glass or an organic polymer. One of the electrodes, typically the anode, is made of a substantially transparent conducting oxide, such as indium tin oxide ("ITO"), tin oxide, indium oxide, zinc oxide, indium zinc oxide, cadmium tin oxide, or a mixture thereof, and is disposed between the organic light emitting layer and the liquid crystal layer so that light from the organic light-emitting layer can be transmitted into the liquid crystal layer. Non-limiting examples of organic EL materials are polymers, copolymers, mixtures of polymers, and lower molecular-weight organic molecules, all having unsaturated bonds. Such materials possess a delocalized π-electron system, which gives the polymer chains or organic molecules the ability to support positive and negative charge carriers with high mobility. Suitable EL polymers are poly(n-vinylcarbazole) ("PVK", emitting violet-to-blue light in the wavelengths of about 380–500 nm); poly (alkylfluorene) such as poly(9,9-dihexylfluorene) (410–550 nm), poly (dioctylfluorene) (wavelength at peak EL emission of 436 nm), or poly{9,9-bis(3,6-dioxaheptyl)-fluorene-2,7-diyl} (400–550 nm); poly(praraphenylene) derivatives such as poly(2-decyloxy-1,4-phenylene) (400–550 nm). Mixtures of these polymers or copolymers based on one or more of these polymers and others may be used to tune the color of emitted light.

Another class of suitable EL polymers is the polysilanes. Polysilanes are linear silicon-backbone polymers substituted with a variety of alkyl and/or aryl side groups. They are quasi one-dimensional materials with delocalized σ-conjugated electrons along polymer backbone chains. Examples of polysilanes are poly(di-n-butylsilane), poly(di-n-pentylsilane), poly(di-n-hexylsilane), poly(methylphenylsilane), and poly{bis (p-butylphenyl)silane} which are disclosed in H. Suzuki et al., "Near-Ultraviolet Electroluminescence From Polysilanes," 331 Thin Solid Films 64–70 (1998). These polysilanes emit light having wavelengths in the range from about 320 nm to about 420 nm.

Organic materials having molecular weight less than about 5000 that are made of a large number of aromatic units are also applicable. An example of such materials is 1,3,5-tris{n-(4-diphenylaminophenyl) phenylamino}benzene, which emits light in the wavelength range of 380–500 nm. The organic EL layer also may be prepared from lower molecular weight organic molecules, such as phenylanthracene, tetraarylethene, coumarin, rubrene, tetraphenylbutadiene, anthracene, perylene, coronene, or their derivatives. These materials generally emit light having maximum wavelength of about 520 nm. Still other suitable materials are the low molecular-weight metal organic complexes such as aluminum-, gallium-, and indium-acetylacetonate, which emit light in the wavelength range of 415–457 nm, aluminum-(picolymethylketone)-bis{2,6-di(t-butyl)phenoxide} or scandium-(4-methoxy-picolylmethylketone)-bis (acetylacetonate), which emits in the range of 420–433 nm.

A light-conversion sheet, as disclosed above, is disposed between the organic light-emitting layer and the liquid crystal layer, to convert light emitted by the organic EL layer to light having substantial intensity in the wavelength ranges of the color filters.

While specific preferred embodiments of the present invention have been disclosed in the foregoing, it will be appreciated by those skilled in the art that many modifications, substitutions, or variations may be made thereto without departing from the spirit and scope of the invention as defined in the appended claims.

What is claimed is:

1. A phosphor composition for a backlight source of a liquid crystal display ("LCD"), said phosphor composition comprising at least a phosphor emitting blue light, at least a phosphor emitting green light, and at least a phosphor emitting red light; wherein said at least a phosphor emitting blue light is selected from the group consisting of $(Sr,Ca,Ba,Mg)_{10}(PO_4)_6(F,Cl,Br,OH):Eu^{2+}$; $(Ba,Sr,Ca)MgAl_{10}O_{17}:Eu^{2+}$; $(Sr,Ca)_{10}(PO_4)_6 \cdot nB_2O_3:Eu^{2+}$, wherein $0<n<1$; $2\ SrO \cdot 0.84\ P_2O_5 \cdot 0.16\ B_2O_3:Eu^{2+}$; $Sr_2Si_3O_8 \cdot 2SrCl_2:Eu^{2+}$; $Ba_3MgSi_2O_8:Eu^{2+}$; $Sr_4Al_{14}O_{25}:Eu^{2+}$; $BaAl_8O_{13}$; $Eu^{2+}$; and mixtures thereof; said at least a phosphor emitting green light is selected from the group consisting of $(Ba,Sr,Ca)MgAl_{10}O_{17}:Eu^{2+},Mn^{2+}$; $(Ba,Sr,Ca)Al_2O_4:Eu^{2+}$; $(Y,Gd,Lu,Sc,La)BO_3:Ce^{3+},Tb^{3+}$; $(Ba,Sr,Ca)_2SiO_4:Eu^{2+}$; $(Ba,Sr,Ca)_2(Mg,Zn)Si_2O_7:Eu^{2+}$; $(Sr,Ca,Ba)(Al,Ga,In)_2S_4:Eu^{2+}$; $(Y,Gd,Tb,La,Sm,Pr,Lu)_x(Al,Ga,In)_yO_{12}:Ce^{3+}$, wherein x is in the range from about 2.8 to and including 3, and y is in the range from about 4.9 to about 5.1; $(Sr,Ca,Ba,Mg,Zn)_2P_2O_7:Eu^{2+},Mn^{2+}$; $(Ca,Sr,Ba,Mg)_{10}(PO_4)_6$ $(F,Cl,Br,OH)$: $Eu^{2+}$, $Mn^{2+}$; $(Ca,Sr,Ba)_8(Mg,Zn)(SiO_4)_4(Cl,F)_2:Eu^{2+},Mn^{2+}$; and mixtures thereof; and said at least a phosphor emitting red light is selected from the group consisting of $(Gd,Y,Lu,La)_2O_3:Eu^{3+},Bi^{3+}$; $(Gd,Y,Lu,La)_2O_2S:Eu^{3+}$, $Bi^{3+}$; $(Gd,Y,Lu,La)VO_4:Eu^{3+},Bi^{3+}$; $SrS:Eu^{2+}$; $SrY_2S_4:Eu^{2+}$; $CaLa_2S_4:Ce^{3+}$; $(Ca,Sr)S:Eu^{2+}$; $3.5\ MgO \cdot 0.5\ MgF_2 \cdot GeO_2:Mn^{4+}$; $(Ba,Sr,Ca)MgP_2O_7:Eu^{2+},Mn^{2+}$; and mixtures thereof.

2. The phosphor composition according to claim 1, wherein said phosphor composition absorbs at least a portion of a first spectrum of light emitted by said backlight source and emits light having a second spectrum different from said first spectrum.

3. The phosphor composition according to claim 2, wherein said second spectrum has higher intensity in regions having wavelengths of about 440–460 nm, about 550–570 nm, and about 630–680 nm than in at least another region of visible spectrum.

4. The phosphor composition according to claim 1, wherein said phosphor composition comprises $(Sr_{0.79}Eu_{0.1}Mn_{0.1}Mg_{0.11})_2P_2O_7$; $(Sr,Ca,Ba,Mg)_{10}(PO_4)_6(F,Cl,Br,OH):Eu^{2+}$; and $3.5\ MgO \bullet 0.5\ MgF_2 \bullet GeO_2:Mn^{4+}$.

5. The phosphor composition according to claim 1, wherein said phosphor composition comprises $(Ca,Sr,Ba)_8(Mg,Zn)(SiO_4)_4(Cl,F)_2:Eu^{2+},Mn^{2+}$; $(Sr,Ca,Ba,Mg)_{10}(PO_4)_6(F,Cl,Br,OH):Eu^{2+}$; and $3.5\ MgO \bullet 0.5\ MgF_2 \bullet GeO_2:Mn^{4+}$.

6. A backlighting system for an LCD comprising:
  a backlight source emitting light having a first spectrum at least in a range from about 300 nm to about 450 nm; and a phosphor composition comprising at least a phosphor emitting blue light, at least a phosphor emitting green light, and at least a phosphor emitting red light; wherein said at least a phosphor emitting blue light is selected from the group consisting of $(Sr,Ca,Ba,Mg)_{10}(PO_4)_6(F,Cl,Br,OH):Eu^{2+}$; $(Ba,Sr,Ca)MgAl_{10}O_{17}:Eu^{2+}$; $(Sr,Ca)_{10}(PO_4)_6 \bullet nB_2O_3:Eu^{2+}$, wherein $0<n<1$; $2\ SrO \bullet 0.84\ P_2O_5 \bullet 0.16\ B_2O_3:Eu^{2+}$; $Sr_2Si_3O_8 \bullet 2\ SrCl_2:Eu^{2+}$; $Ba_3MgSi_2O_8:Eu^{2+}$; $Sr_4Al_{14}O_{25}:Eu^{2+}$; $BaAl_8O_{13}:Eu^{2+}$; and mixtures thereof; said at least a phosphor emitting greenlight is selected from the group consisting of $(Ba,Sr,Ca)MgAl_{10}O_{17}:Eu^{2+},Mn^{2+}$; $(Ba,Sr,Ca)Al_2O_4:Eu^{2+}$; $(Y,Gd,Lu,Sc,La)BO_3:Ce^{3+},Tb^{3+}$; $(Ba,Sr,Ca)_2SiO_4:Eu^{2+}$; $(Ba,Sr,Ca)_2(Mg,Zn)Si_2O_7:Eu^{2+}$; $(Sr,Ca,Ba)(Al,Ga,In)_2S_4:Eu^{2+}$; $(Y,Gd,Tb,La,Sm,Pr,Lu)_x(Al,Ga)_yO_{12}:Ce^{3+}$, wherein x is in the range from about 2.8 to and including 3, and y is in the range from about 4.9 to about 5.1; $(Sr,Ca,Ba,Mg,Zn)_2P_2O_7:Eu^{2+},Mn^{2+}$; $(Ca,Sr,Ba,Mg)_{10}(PO_4)_6(F,Cl,Br,OH):Eu^{2+},Mn^{2+}$; $(Ca,Sr,Ba)_8(Mg,Zn)(SiO_4)_4(Cl,F)_2:Eu^{2+},Mn^{2+}$; and mixtures thereof; and said at least a phosphor emitting red light is selected from the group consisting of $(Gd,Y,Lu,La)_2O_3:Eu^{3+},Bi^{3+}$; $(Gd,Y,Lu,La)_2O_2S:Eu^{3+},Bi^{3+}$; $(Gd,Y,Lu,La)VO_4:Eu^{3+},Bi^{3+}$; $SrS:Eu^{2+}$; $SrY_2S_4:Eu^{2+}$; $CaLa_2S_4:Ce^{3+}$; $(Ca,Sr)S:Eu^{2+}$; $3.5\ MgO \bullet 0.5\ MgF_2 \bullet GeO_2:Mn^{4+}$; $(Ba,Sr,Ca)MgP_2O_7:Eu^{2+},Mn^{2+}$; and mixtures thereof; wherein said phosphor composition is disposed to absorb light of at least a portion of said first spectrum and emits light having a second spectrum different from said first spectrum.

7. The backlighting system according to claim 6, wherein said second spectrum has higher intensity in regions having wavelengths of about 440–460 nm, about 550–570 nm, and about 630–680 nm than in at least another region of visible spectrum.

8. The backlighting system according to claim 6, wherein said phosphor composition comprises $(Sr_{0.79}Eu_{0.1}Mn_{0.1}Mg_{0.11})_2P_2O_7$; $(Sr,Ca,Ba,Mg)_{10}(PO_4)_6(F,Cl,Br,OH):Eu^{2+}$; and $3.5\ MgO \bullet 0.5\ MgF_2 \bullet GeO_2:Mn^{4+}$.

9. The backlighting system according to claim 6, wherein said phosphor composition comprises $(Ca,Sr,Ba)_8(Mg,Zn)(SiO_4)_4(Cl,F)_2:Eu^{2+},Mn^{2+}$; $(Sr,Ca,Ba,Mg)_{10}(PO_4)_6(F,C,Br,OH):Eu^{2+}$; and $3.5\ MgO \bullet 0.5\ MgF_2 \bullet GeO_2:Mn^{4+}$.

10. The backlighting system according to claim 6, wherein said phosphor composition is dispersed in a substantially transparent resin to form a mixture, and said mixture is formed into a light-conversion layer that is disposed between said backlight source and a layer of liquid crystal material of said LCD.

11. The backlighting system according to claim 10, wherein said substantially transparent resin comprises at least a material selected from the group consisting of acrylate resins, epoxy resins, silicone, and silicone-functionalized epoxy.

12. The backlighting system according to claim 10, wherein said mixture further comprises particles of a light-scattering material.

13. The backlighting system according to claim 6, wherein said backlight source comprises at least a light-emitting diode ("LED").

14. The backlighting system according to claim 13, wherein said mixture is disposed on a light-emitting element of said LED.

15. The backlighting system according to claim 6, wherein said backlight source comprises at least an organic electroluminescent device ("OELD").

16. The backlighting system according to claim 15, wherein said OELD comprises an organic light-emitting layer disposed between two electrodes, and said organic light-emitting layer emits light when a voltage is applied across said electrodes.

17. A liquid crystal display comprising:
  (a) a backlighting system comprising:
    (1) a backlight source emitting light having a first spectrum at least in a range from about 300 nm to about 450 nm; and
    (2) a phosphor composition comprising at least a phosphor emitting blue light, at least a phosphor emitting green light, and at least a phosphor emitting red light; wherein said at least a phosphor emitting blue light is selected from the group consisting of $(Sr,Ca,Ba,Mg)_{10}(PO_4)_6(F,Cl,Br,OH):Eu^{2+}$; $(Ba,Sr,Ca)MgAl_{10}O_{17}:Eu^{2+}$; $(Sr,Ca)_{10}(PO_4)_6 \bullet nB_2O_3:Eu^{2+}$, wherein $0<n<1$; $2\ SrO \bullet 0.84\ P_2O_5 \bullet 0.16\ B_2O_3:Eu^{2+}$; $Sr_2Si_3O_8 \bullet 2\ SrCl_2:Eu^{2+}$; $Ba_3MgSi_2O_8:Eu^{2+}$; $Sr_4Al_{14}O_{25}:Eu^{2+}$; $BaAl_8O_{13}:Eu^{2+}$; and mixtures thereof; said at least a phosphor emitting green light is selected from the group consisting of $(Ba,Sr,Ca)MgAl_{10}O_{17}:Eu^{2+},Mn^{2+}$; $(Ba,Sr,Ca)Al_2O_4:Eu^{2+}$; $(Y,Gd,Lu,Sc,La)BO_3:Ce^{3+},Tb^{3+}$; $(Ba,Sr,Ca)_2SiO_4:Eu^{2+}$; $(Ba,Sr,Ca)_2(Mg,Zn)Si_2O_7:Eu^{2+}$; $(Sr,Ca,Ba)(Al,Ga,In)_2S_4:Eu^{2+}$; $(Y,Gd,Tb,La,Sm,Pr,Lu)_x(Al,Ga,In)_yO_{12}:Ce^{3+}$, wherein x is in the range from about 2.8 to and including 3, and y is n the range from about 4.9 to about 5.1; $(Sr,Ca,Ba,Mg,Zn)_2P_2O_7:Eu^{2+},Mn^{2+}$; $(Ca,Sr,Ba,Mg)_{10}(PO_4)_6(F,Cl,Br,OH):Eu^{2+},Mn^{2+}$; $(Ca,Sr,Ba)_8(Mg,Zn)(SiO_4)_4(Cl,F)_2:Eu^{2+},Mn^{2+}$; and mixtures thereof; and said at least a phosphor emitting red light is selected from the group consisting of $(Gd,Y,Lu,La)_2O_3:Eu^{3+},Bi^{3+}$; $(Gd,Y,Lu,La)_2O_2S:Eu^{3+},Bi^{3+}$; $(Gd,Y,Lu,La)VO_4:Eu^{3+},Bi^{3+}$; $SrS:Eu^{2+}$; $SrY_2S_4:Eu^{2+}$; $CaLa_2S_4:Ce^{3+}$; $(Ca,Sr)S:Eu^{2+}$; $3.5\ MgO \bullet 0.5\ MgF_2 \bullet GeO_2:Mn^{4+}$; $(Ba,Sr,Ca)MgP_2O_7:Eu^{2+},Mn^{2+}$; and mixtures thereof; wherein said phosphor composition is disposed to absorb light of at least a portion of said first spectrum and emits light having a second spectrum different from said first spectrum; and
  (b) a liquid crystal material disposed to receive light having said second spectrum.

18. The liquid crystal display according to claim 17; wherein said liquid crystal material is disposed between a pair of first and second substantially transparent plates, a surface of each of said plates adjacent to said liquid crystal material carries an electrode such that overlapping regions of two electrodes define a plurality of pixels of said liquid crystal display; and color filters allowing blue, green, and red light to pass through said liquid crystal material are disposed on every three adjacent pixels.

19. The liquid crystal display according to claim 17, wherein said second spectrum has higher intensity in regions having wavelengths of about 440–460 nm, about 550–570 nm, and about 630–680 nm than in at least another region of visible spectrum.

20. The liquid crystal display according to claim 17, wherein said phosphor composition comprises $(Sr_{0.79}Eu_{0.1}Mn_{0.1}Mg_{0.11})_2P_2O_n$; $(Sr,Ca,Ba,Mg)_{10}(PO_4)_6(F,Cl,Br,OH):Eu^{2+}$; and $3.5\ MgO \cdot 0.5\ MgF_2 \cdot GeO_2:Mn^{4+}$.

21. The liquid crystal display according to claim 17, wherein said phosphor composition comprises $(Ca,Sr,Ba)_8(Mg,Zn)(SiO_4)_4(Cl,F)_2:Eu^{2+},Mn^{2+}$; $(Sr,Ca,Ba,Mg)_{10}(PO_4)_6(F,Cl,Br,OH):Eu^{2+}$; and $3.5\ MgO \cdot 0.5\ MgF_2 \cdot GeO_2:Mn^{4+}$.

22. The liquid crystal display according to claim 17, wherein said phosphor composition is dispersed in a substantially transparent resin to form a mixture, and said mixture is formed into a light-conversion layer that is disposed between said backlight source and a layer of liquid crystal material of said LCD.

23. The liquid crystal display according to claim 22, wherein said substantially transparent resin comprises at least a material selected from the group consisting of acrylate resins, epoxy resins, silicone, and silicone-functionalized epoxy.

24. The liquid crystal display according to claim 22, wherein said mixture further comprises particles of a light-scattering material.

25. The liquid crystal display according to claim 17, wherein said backlight source comprises at least an LED.

26. The liquid crystal display according to claim 25, wherein said mixture is disposed on a light-emitting element of said LED.

27. The liquid crystal display according to claim 17, wherein said backlight source comprises at least an OELD.

28. The liquid crystal display according to claim 27, wherein said OELD comprises an organic light-emitting layer disposed between two electrodes, and said organic light-emitting layer emits light when a voltage is applied across said electrodes.

* * * * *